UNITED STATES PATENT OFFICE.

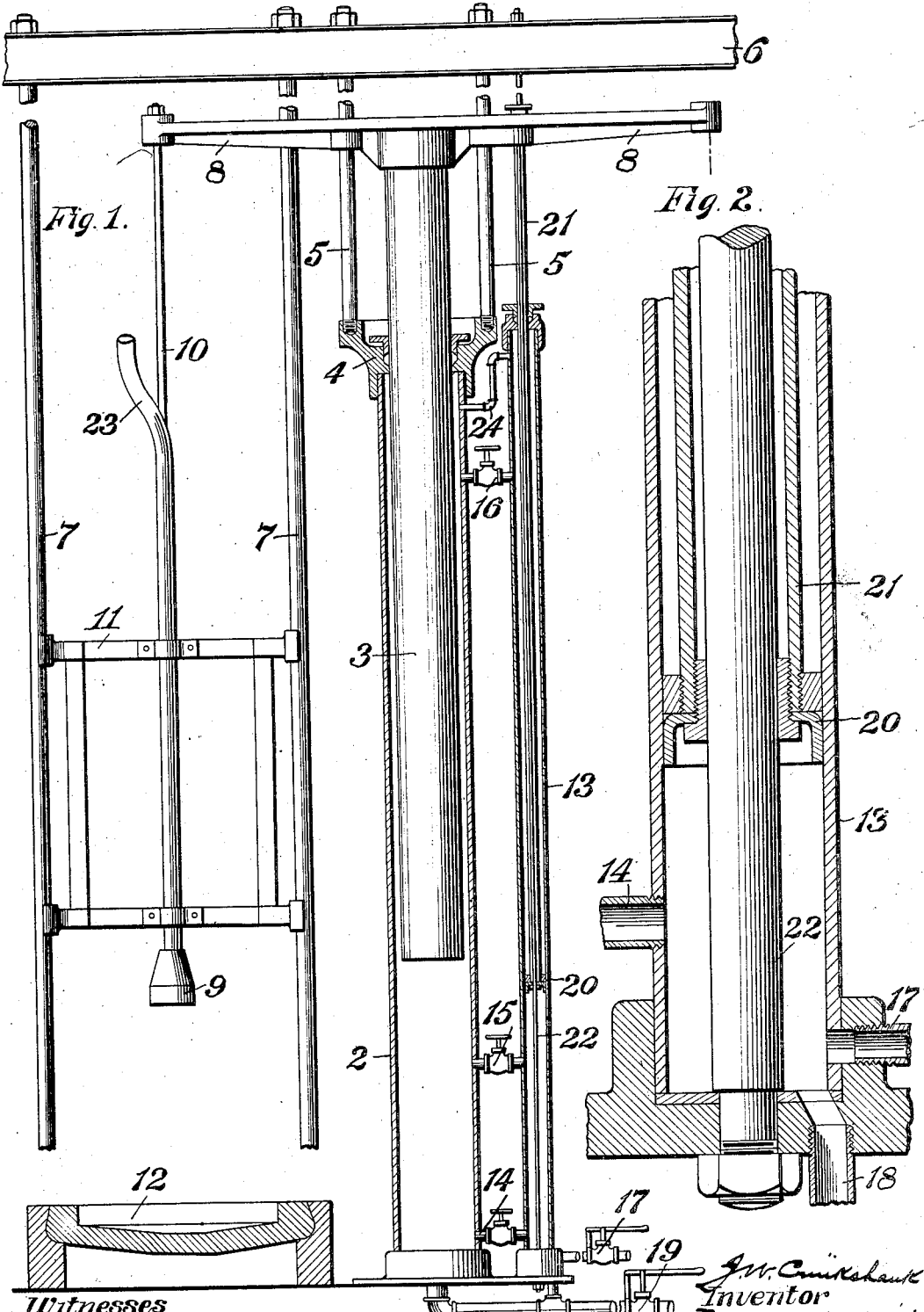

JAMES W. CRUIKSHANK, OF OAKMONT, PENNSYLVANIA.

GLASS-DRAWING APPARATUS.

No. 914,117.  Specification of Letters Patent.  Patented March 2, 1909.

Application filed March 20, 1908. Serial No. 422,300.

*To all whom it may concern:*

Be it known that I, JAMES W. CRUIKSHANK, a resident of Oakmont, in the county of Allegheny and State of Pennsylvania, have invented certain new and useful Improvements in Glass-Drawing Apparatus, of which the following is a specification.

In operating glass drawing machines, particularly window-glass-cylinder machines, it is necessary to raise the drawing mechanism at varying speed, comparatively slow at first to insure a strong upper end for the glass blank at and below its union with the bait, after which the movement gradually increases.

The primary object of this invention is to provide improved mechanism for automatically regulating the speed, the necessary slower movement being had at the beginning of the operation, with controlled or adjustable means for increasing the speed as conditions may require. The operation being automatic, the close attention of an attendant is not required, and hence the element of loss due to negligence is practically eliminated. Furthermore, the improved apparatus is of simple and inexpensive construction, and is operated at relatively low cost.

An embodiment of the invention is illustrated in the accompanying drawings, Figure 1 being an elevation of the same, broken and partly in section. Fig. 2 is a section of the speed regulating device, enlarged to approximately full size.

Referring to the drawings, 2 designates the cylinder and 3 the plunger of the hydraulic lift, with cylinder head 4 connected by rods 5 with the superstructure 6, from which depend guide rods 7. Projecting laterally from the upper end of plunger 3 are arms 8, with a bait 9 suspended from each arm by a rod 10. A cross-head 11, sliding between rods 7, holds the bait centrally over pot or other container 12 from which the molten glass is drawn.

Paralleling cylinder 2 is tube or cylinder 13 of the controlling mechanism, with a valve connection 14 between the lower ends of the two cylinders, while higher up is a similar connection 15, and above this another similar connection 16. Water under pressure is admitted to the lower end of cylinder 13 through the valved connection 17, and the bottom of each cylinder is connected at 18 to the valve outlet or exhaust 19. Working within cylinder 13 is piston 20 on the lower end of tubular piston rod 21, with the upper end of the latter secured to one of arms 8. Piston rod 21 is necessarily of considerable length, and to prevent buckling a rod 22 is extended the whole length of cylinder 13, with its upper end connected to frame 6, the rod being embraced by piston 20 and the tubular rod 21, thus bracing the latter as they raise and lower in unison with the main plunger 3.

In operation, when the mechanism is in lowered position, with bait 9 entered in the glass contained in pot 12 (to which it may be conveyed from a melting pot or tank in any suitable manner), piston 20 is below connection 15, and hence water can pass to cylinder 2 only through connection 14, the valve of which may be so adjusted as to obtain the low rate of speed required at the beginning. Thus, ample time is afforded for the glass to form around and obtain a secure hold on bait 9. As plunger 3 moves upward, air under pressure as required for blowing the blank is admitted to the interior of the bait through tube 23, in manner well known in the art. After the blank has been well started, the continued upward movemnet of piston 20 uncovers the second valved connection 15 which, like connection 14, may be adjusted as required for admitting a larger volume of water to cylinder 2 and thereby increasing the speed of plunger 3. Any number of connections may thus be arranged between the two cylinders, and opened one after the other by piston 20 for gradually increasing the upward speed of the drawing mechanism. In the adaptation here shown, a third connection 16 is arranged well up toward the upper end, and above this the cylinders may be connected through by-pass 24, thus discharging the water above piston 20 as the latter moves upward, and especially after the piston passes the uppermost connection 16. At the completion of the drawing operation, exhaust valve 19 may be operated as required for discharging the water from the cylinders and lowering the mechanism.

It is characteristic of the invention that the admission of water to the main cylinder in increasing amounts as the plunger moves upward is controlled automatically by such upward movement. And with a valve for each of the cylinder connections, the increasing volume of water admitted through each may be regulated as conditions may require, thereby insuring uniformity of operation and the best possible results.

I claim:—

1. In glass drawing apparatus, glass drawing means, a hydraulic cylinder and a plunger with a connection between the plunger and the drawing means, a plurality of water inlets for the cylinder, and means controlled by the movement of the plunger while actuating the drawing means for opening said inlets.

2. In glass drawing apparatus, glass drawing means, a hydraulic cylinder and a plunger with a connection between the plunger and the drawing means, a plurality of water inlets for the cylinder spaced apart in the direction of movement of the plunger, and means controlled by the movement of the plunger while operating the drawing means for opening said inlets successively.

3. In glass drawing apparatus, glass drawing means, a hydraulic lift including a cylinder and plunger with a connection between the plunger and the drawing means, a series of water inlets for the cylinder—one above the other, and means controlled by the upward movement of the plunger for opening said inlets successively.

4. In glass drawing apparatus, glass drawing means, a hydraulic lift including a cylinder and plunger with a connection between the plunger and drawing means, a second cylinder having a water inlet at its lower end, a plurality of water passages connecting the cylinders—arranged one above the other, and a piston within the second cylinder connected to and raised by the lift plunger for establishing communication through said passages successively as the plunger moves upward.

5. In glass drawing apparatus, glass drawing means, a hydraulic lift including a cylinder and plunger with a connection between the plunger and drawing means, a second cylinder having a water inlet at its lower end, a series of valved connections between the cylinders—arranged one above the other, and a piston in the second cylinder connected to and raised by the lift plunger for establishing communication through the valve connections as the plunger moves upward.

6. In glass drawing apparatus, glass drawing means, a hydraulic lift including a cylinder and plunger with a connection between the cylinder and drawing means, a second cylinder paralleling the lift cylinder with a water inlet at the lower end of the second cylinder, a plurality of water admitting connections between the cylinders—arranged one above the other, a piston within the second cylinder connected by a tubular rod with the plunger whereby said connections are uncovered successively as the plunger moves upward, and a guide extending through the said second cylinder on which the tubular rod moves.

In testimony whereof I affix my signature in presence of two witnesses.

JAMES W. CRUIKSHANK.

Witnesses:
 JNO. J. FITZGERALD,
 J. M. NESBIT.